Feb. 25, 1930.  B. L. HART  1,748,221
AUTOMATIC DASHLIGHT APPARATUS FOR AUTOMOBILES

Filed Sept. 26, 1927

INVENTOR.
BURCHARD L. HART
BY A. B. Bowman
ATTORNEY

Patented Feb. 25, 1930

1,748,221

UNITED STATES PATENT OFFICE

BURCHARD L. HART, OF SAN DIEGO, CALIFORNIA

AUTOMATIC DASH-LIGHT APPARATUS FOR AUTOMOBILES

Application filed September 26, 1927. Serial No. 222,158.

My invention relates to automatic dashlight apparatus for automobiles and the objects of my invention are: first, to provide means for automatically illuminating the floor board controls and indicators of an automobile when the clutch pedal is pressed forward and the clutch thrown out; second, to provide an electric switch means operable on forward movement of the clutch pedal for connecting lamps conveniently located for illuminating the controls and the floor board of a car or other vehicle; third, to provide a device of this class operable by the clutch pedal which may be readily installed in any make of car, and fourth, to provide a device of this class which is simple and economical of construction, durable, easy to install, and which will not readily deteriorate or get out of order.

Figure 1:
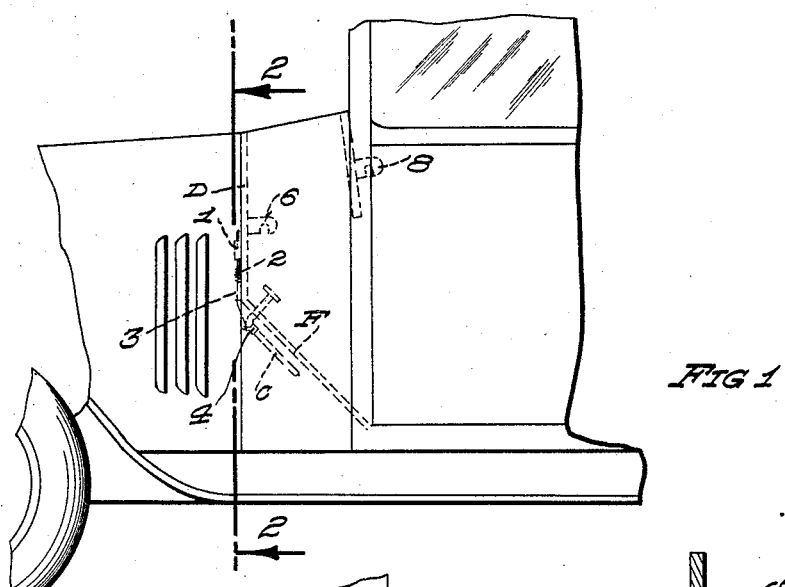
Figure 2:
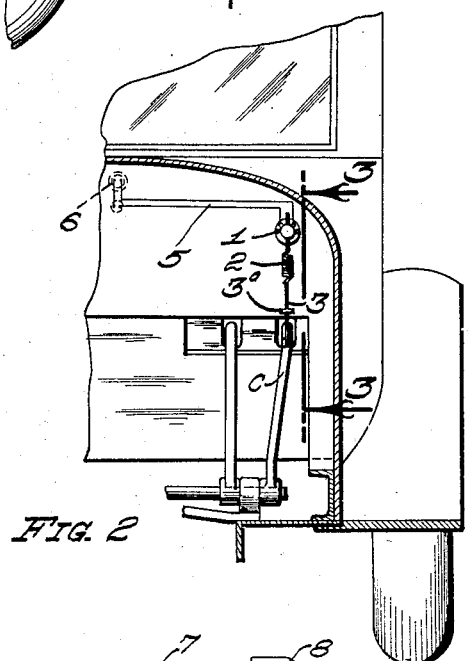
Figure 3:
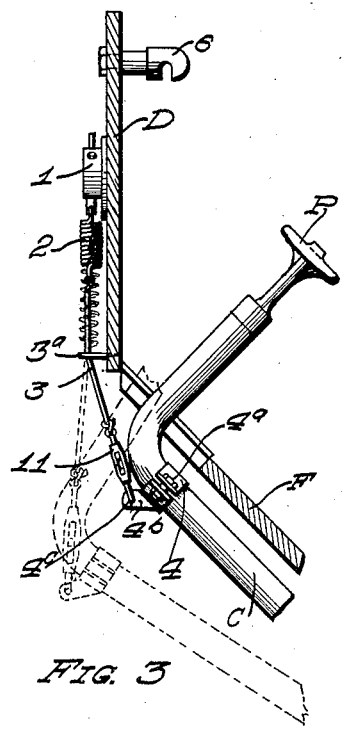
Figure 4:
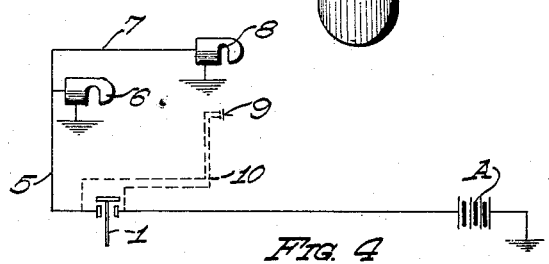

With these and other objects in view, as will appear hereinafter, my invention consists of certain novel features of construction, combination and arrangement of parts and portions as will be hereinafter described in detail and particularly set forth in the appended claim, reference being had to the accompanying drawings and to the characters of reference thereon which form a part of this application, in which:

Figure 1 is a side elevational view of part of the front portion of an automobile indicating by dotted lines the location of the various parts of said apparatus; Fig. 2 is a sectional view taken along the line 2—2 in Fig. 1, showing the relative position of a switch and dashboard lamp and method of operating the switch; Fig. 3 is an enlarged sectional view taken along the lines 3—3 of Fig. 2, and Fig. 4 is a connection diagram showing the control of the lamp when used in connection with my device.

Similar characters of reference refer to similar parts and portions throughout the several views of the drawings.

The switch 1, spring 2, cable 3, clamp 4, connection 5, lamp 6, connection 7, lamp 8, push button switch 9, and connection 10, form the principal parts and portions of my device.

The switch 1, which may be of any conventional construction and preferably a reciprocating type normally held in open position is preferably secured to the front of the dashboard D of the automobile, in a position directly over the clutch lever C and towards the top of the dashboard D. Positioned beneath the floor board F a clamp means 4 is secured to the clutch lever C. The clamp 4 may be formed of sheet metal and may be secured by means of a screw $4^a$ rigidly in place, and is provided with an ear $4^b$ having a perforation $4^c$. The switch 1 is connected by means of a helical spring 2 and the flexible cable 3 to the ear $4^b$ of the clamp 4, in any desirable manner. A guide $3^a$ which may assume the form of an eye screw is secured to the bottom of the dashboard D in line with the switch and the clamp 4, and serves to guide the cable 3 and prevent it from touching the floor boards and facilitates its free movement. In order to provide means for adjusting the tension of the cable 3 a turnbuckle or similar device 11 may be provided.

As illustrated in Fig. 4 one terminal of the switch 1 is connected to the battery A of the car, the negative terminal of which is invariably grounded to the frame of the car. The other switch terminal is connected to the lamp 6 and the lamp 8 by means of wires 5 and 7. As both lamps are grounded to the car frame the circuit to the battery is completed therethrough.

When the clutch lever C is pressed forward and assumes the position indicated by dotted lines in Fig. 3, the clamp 4 travels downwardly with respect to the switch 1, and causes the cable 3 to move into the vertical position indicated by dotted lines, thereby causing the switch 1 to be closed and extending the helical spring 2, after the switch 1 has reached its closed position. The purpose of the helical spring 2 is merely to provide a resilient means in the connection between the clamp 4 and the switch 1, in order to prevent rupture of the cable 3, due to excessive movement of the clutch lever. As indicated in Fig. 1 the lamp 6 is placed on the dashboard while the lamp 8 may be the lamp usually provided on the instrument board of the car. These lamps may be attached to the conventional type of dashboard sockets. As it is usual to provide these sockets with a switch it is necessary to have the switches in the closed position when used in conjunction with my device.

In order to enable the operator to light the switches without touching the clutch, a suitable press button switch 9 may be provided in any convenient position, such as on the instrument board. As indicated in Fig. 4 the press button switch is connected across the terminals of the switch 1 by means of the conductors 10 so that the switch 1 is shunted by switch 9 when the latter is closed.

It is obvious from the construction, as illustrated in the drawings and described in the foregoing specification, that there is provided a structure as aimed at and set forth in the objects of the invention, and though I have shown and described a particular construction, combination and arrangement of parts and portions, I do not wish to be limited to this particular construction, combination and arrangement but desire to include in the scope of my invention the construction, combination and arrangement substantially as set forth in the appended claim.

Having thus described my invention, what I claim as new and desire to secure by Letters Patent is:

The combination with one of the foot operated levers of an automobile, of a normally open electric switch positioned on the front of the dashboard above said lever, a clamp member having a forwardly extending ear portion secured to said lever near the bend thereof, means for mechanically connecting the switch with said ear portion, whereby said switch may be actuated on depression of said lever, a lamp positioned within said automobile for illuminating a portion of the interior thereof and electrical connections from said switch to said lamp.

In testimony whereof, I have hereunto set my hand at San Diego, California, this 16th day of September, 1927.

BURCHARD L. HART.